United States Patent
Huus et al.

(10) Patent No.: US 10,896,066 B2
(45) Date of Patent: Jan. 19, 2021

(54) RATE LIMITING IN QUERY PROCESSING BASED ON COMPUTATION COST

(71) Applicant: Shopify Inc., Ottawa (CA)

(72) Inventors: Evan Jan Huus, Ottawa (CA); Klass Neufeld, Cambridge (CA); Scott Walkinshaw, Toronto (CA); Christopher John Butcher, Toronto (CA); Ali Kiyan Azarbar, Toronto (CA)

(73) Assignee: Shopify Inc., Ottawa (CA)

(*) Notice: Subject to any disclaimer, the term of this patent is extended or adjusted under 35 U.S.C. 154(b) by 111 days.

(21) Appl. No.: 16/219,638

(22) Filed: Dec. 13, 2018

(65) Prior Publication Data
US 2020/0192706 A1    Jun. 18, 2020

(51) Int. Cl.
*G06F 9/50* (2006.01)
*G06F 9/54* (2006.01)
*G06F 16/245* (2019.01)
*G06F 16/33* (2019.01)

(52) U.S. Cl.
CPC .............. *G06F 9/505* (2013.01); *G06F 9/54* (2013.01); *G06F 16/245* (2019.01); *G06F 16/3334* (2019.01)

(58) Field of Classification Search
CPC . G06F 9/505; G06F 9/54; G06F 16/24; G06F 16/3334; G06F 16/245; H04L 67/42
See application file for complete search history.

(56) References Cited

U.S. PATENT DOCUMENTS

| | | | |
|---|---|---|---|
| 8,681,630 B1* | 3/2014 | Gibson | G06F 9/54 370/235 |
| 9,229,983 B2* | 1/2016 | Yu | G06F 16/24542 |
| 9,436,735 B1* | 9/2016 | Feng | G06F 16/24549 |
| 10,242,061 B2* | 3/2019 | Luo | G06F 16/2453 |
| 10,387,578 B1* | 8/2019 | Xiao | G06F 16/24553 |
| 10,587,597 B1* | 3/2020 | Seidenberg | H04L 63/1491 |

(Continued)

OTHER PUBLICATIONS

"GraphQL resource limitations", GitHub Developer Guide, https://developer.github.com/v4/guides/resource-limitations/ (accessed online on May 7, 2019), 2019, 7 pages.

(Continued)

*Primary Examiner* — Benjamin C Wu
(74) *Attorney, Agent, or Firm* — GTC Law Group PC & Affiliates

(57) ABSTRACT

A computer-implemented method and system for receiving, at a first computing device, an application programming interface (API) request from a second computing device, wherein the API request includes at least a first request field and a second request field, evaluating at least the first request field to determine a first complexity measure, assigning a first field score to at least the first request field based on the first complexity measure, evaluating at least the second request field to determine a second complexity measure, assigning a second field score to at least the second request field based on the second complexity measure, and combining the first field score and the second field score to generate a total field score for the API request for use in an API request complexity model for constraining a processing of the received API request from the second computing device.

45 Claims, 5 Drawing Sheets

(56) References Cited

U.S. PATENT DOCUMENTS

| | | | | |
|---|---|---|---|---|
| 2011/0131199 | A1* | 6/2011 | Simon | G06F 16/24542 707/714 |
| 2011/0238838 | A1* | 9/2011 | Avalani | G06F 9/505 709/226 |
| 2013/0212603 | A1* | 8/2013 | Cooke | G06F 9/542 719/328 |
| 2015/0256479 | A1* | 9/2015 | Avalani | H04L 47/70 709/226 |
| 2015/0261817 | A1* | 9/2015 | Harris | G06F 16/24542 707/718 |
| 2016/0381088 | A1* | 12/2016 | Weihl | H04L 41/50 709/219 |
| 2017/0374177 | A1* | 12/2017 | Chrysanthakopoulos | G06F 9/541 |
| 2018/0046675 | A1 | 2/2018 | Zhou | G06F 16/24549 |
| 2018/0248807 | A1 | 8/2018 | Murphy | H04L 67/125 |
| 2018/0349364 | A1* | 12/2018 | Arnold | G06F 16/23 |
| 2018/0357275 | A1* | 12/2018 | Kirk | G06F 16/24542 |
| 2019/0230182 | A1* | 7/2019 | Martin | H04L 67/2842 |
| 2020/0042521 | A1* | 2/2020 | Isoda | G06F 16/24542 |
| 2020/0059471 | A1* | 2/2020 | Farrell | G06F 9/44526 |
| 2020/0081992 | A1* | 3/2020 | Lynch | G06F 16/24578 |
| 2020/0134070 | A1* | 4/2020 | Sidoti | G06F 16/23 |
| 2020/0219028 | A1* | 7/2020 | Papaemmanouil | G06F 9/45558 |

OTHER PUBLICATIONS

"Securing Your GraphQL API from Malicious Queries", Apollo GraphQL, https://blog.apollographql.com/securing-your-graphql-api-from-malicious-queries-16130a324a6b (accessed online on May 7, 2019), Feb. 21, 2018, 9 pages.

Weiss, "Flow I learned to stop worrying and love Cosmos DB's Request Units", Medium, https://medium.com/@thomasweiss_io/how-i-learned-to-stop-worrying-and-love-cosmos-dbs-request-units-92c68c62c938 (accessed online on Dec. 18, 2018), Jul. 27, 2017, 8 pages.

* cited by examiner

E-Commerce Platform

Q Search

JG John's Apparel
Jonny B. Good

- ⌂ Home
- ⇥ Orders (652)
- ⬨ Products
- ○ Customers
- ⬚ Reports
- ⚙ Discounts
- ⊞ Apps SALES CHANNELS ⊕
- ▭ Online Store
- ▯ Mobile App
- View all channels ⚙ Settings

Good afternoon, Jonny B..

Here's what's happening with your store today.

Today's total sales    Today's visits
$98.00    1

- Update your Platform Payments tax details
  We require additional information to verify your identity.
  [ Update tax details ]

- Advanced Cash on Delivery has been deactivated for your store
  [ See why ]

- Pinterest has been disabled. Review its eligibility requirements to find out how to enable it again.

All channels ▾    Today ▾

TOTAL SALES      Jun 1
$98.00      2 orders $125
$75
$25
  12am   8am   4pm   11pm

TOTAL SALES BY CHANNEL    Jun 1

Online Store    View dashboard
$0.00    0 orders

Mobile App
$0.00    0 orders

Shopify POS (126 York St.)
$0.00    0 orders

FIG. 2

RATE LIMITING IN QUERY PROCESSING BASED ON COMPUTATION COST

FIELD

The present disclosure relates generally to rate and other limiting in query-based systems, and more particularly to utilizing scoring in rate limiting of API requests, such as in a web service.

BACKGROUND

Web services utilizing an application programming interface (API) for communication between backend systems and frontend users may rely on a structured architecture that defines a set of constraints to provide interoperability between computer systems. One aspect of this web service architecture is the management of API requests such that the backend system is not overwhelmed by API requests from the frontend users. For example, limits on the number of requests over a period of time may be imposed in order to help manage API requests by the backend system. However, current methods and systems for managing API requests are still not sufficient to adequately manage API requests, especially for backend systems that serve a great number and variety of public frontend users in a high data volume environment.

Therefore, there is a need in the art for methods and systems that provide improved API request management schemes.

SUMMARY

In an aspect, a computer-implemented method may include receiving, at a first computing device, an application programming interface (API) request from a second computing device, wherein the API request comprises at least a first request field and a second request field; evaluating at least the first request field to determine a first complexity measure; assigning a first field score to at least the first request field based on the first complexity measure; evaluating at least the second request field to determine a second complexity measure; assigning a second field score to at least the second request field based on the second complexity measure; and combining the first field score and the second field score to generate a total field score for the API request for use in an API request complexity model for constraining a processing of the received API request from the second computing device. In embodiments, the API request may be one of a plurality of API requests from the second computing device, and where the API request complexity model factors previous API requests from the second computing device in constraining the processing of received API requests from the second computing device. Constraining the processing of received API requests may include delaying the processing of the API request based on an output of the API request complexity model based on the total field score for the API request. At least one of the first complexity measure and second complexity measure may be determined by evaluating a field type. Constraining the processing of received API requests may include slowing a rate of processing of subsequently received API requests based on an output of the API request complexity model as a result of the total field score for the API request. The output of the API request complexity model may be a level value that is a fraction of a maximum score limit for accumulated API request scores. The output of the API request complexity model may be an overflow indication that a maximum score limit has been exceeded for accumulated API request scores, such as where the rate of processing of subsequently received API requests is reduced to a low value or zero. The method may further include retrieving an API request allocation limit and a current API request usage level from the API request complexity model; combining the total field score and the current API request usage level to generate a new API request usage level; comparing the new API request usage level and the API request allocation limit; and processing the API request if the new API request usage level has a value less than the API request allocation limit. Processing the API request and measuring a processing load on the first computing device that results from the processing of the API request, where the measured processing load is compared to an estimated processing load determined from the total field score to determine a compensation measure to adjust the new API request usage level, such as where the compensation measure increases the new API request usage level because the measured processing load is less than the estimated processing load, the compensation measure decreases the new API request usage level because the measured processing load is greater than the estimated processing load, and the like. The API request allocation limit may be dynamically calculated at a query run-time of the API request based on a field content of at least one of the first request field and the second request field. The API request complexity model may incorporate feedback loop learning with respect to increasing processing performance of the first computing device, such as where the feedback loop learning compares processing performance of the first computing device from a first period of time to a processing performance from a second period of time, where the first period of time utilizes a first set of complexity measures and the second period of time utilizes a second set of complexity measures.

In an aspect, a system may include a first computing device adapted to receive an application programming interface (API) request from a second computing device, wherein the API request comprises at least a first request field and a second request field, the first computing device configured to store a set of instructions that, when executed, cause the first computing device to: evaluate at least the first request field to determine a first complexity measure, assign a first field score to at least the first request field based on the first complexity measure, evaluate at least the second request field to determine a second complexity measure; assign a second field score to at least the second request field based on the second complexity measure, and combine the first field score and the second field score to generate a total field score for the API request for use in an API request complexity model for constraining a processing of the received API request from the second computing device. In embodiments, the API request may be one of a plurality of API requests from the second computing device, and where the API request complexity model factors previous API requests from the second computing device in constraining the processing of received API requests from the second computing device. Constraining the processing of received API requests may include delaying the processing of the API request based on an output of the API request complexity model based on the total field score for the API request. At least one of the first complexity measure and second complexity measure may be determined by evaluating a field type. Constraining the processing of received API requests may include slowing a rate of processing of subsequently received API requests based on an output of the API request complexity model as a result of the total field score for the API request.

BRIEF DESCRIPTION OF THE FIGURES

FIG. 2 depicts an embodiment of a home page of an administrator.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
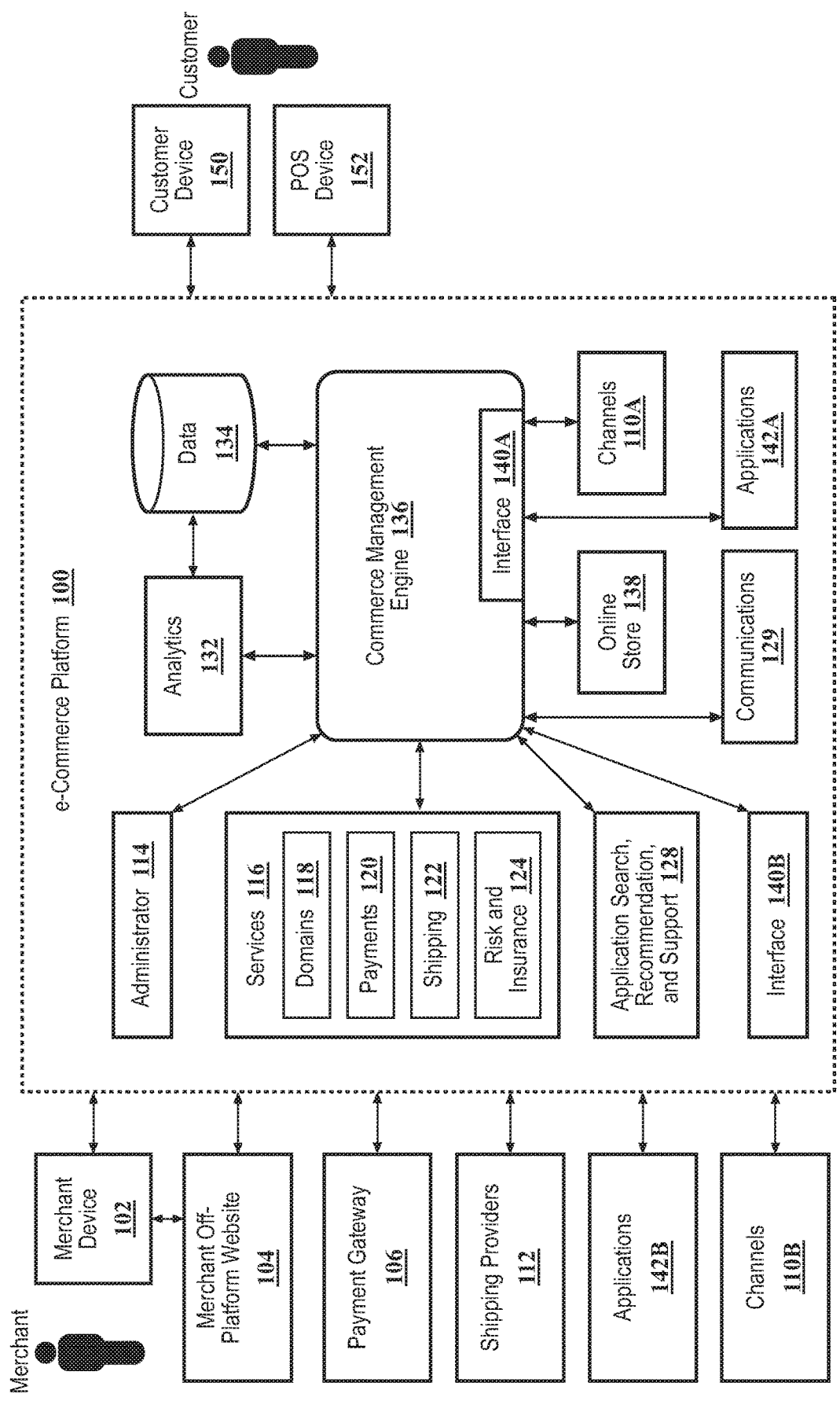
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152

(e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Figure 3:
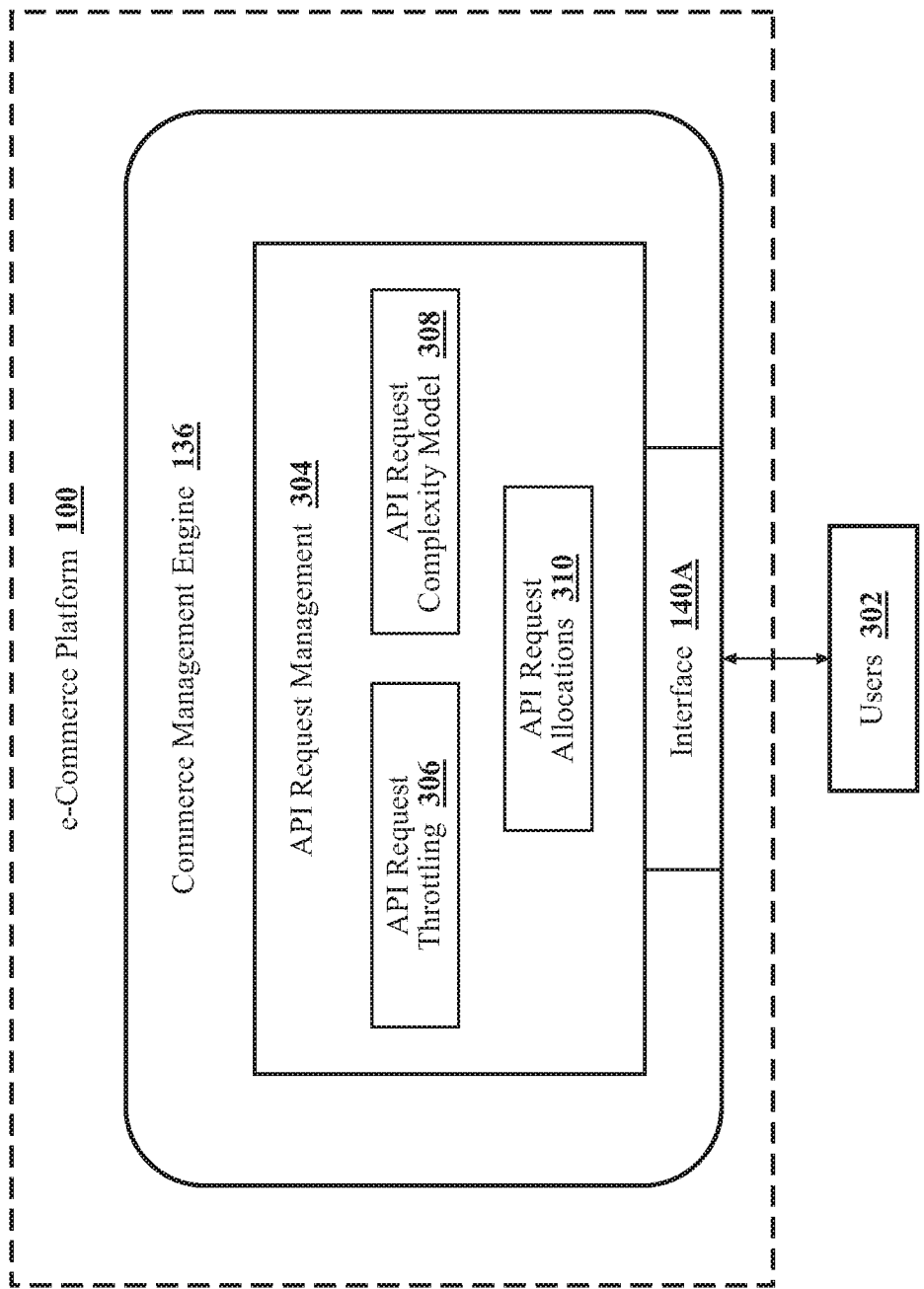
FIG. 3 depicts an embodiment of an API request management system.

In embodiments, the e-commerce platform 100 may utilize APIs to expose the functionality and data available through and within the commerce management engine 136 to the functionality of applications. For instance, the e-commerce platform 100 may provide API interfaces to merchants, storefronts, applications, third parties, partner-facing products and services, and the like, such as including application extensions, process flow services, developer-facing resources, and the like. The flexibility offered through use of applications and APIs enable the e-commerce platform 100 to better accommodate new and unique needs of merchants and developers without requiring constant change to the commerce management engine 136. Further, the e-commerce platform 100 may provide a structured web service API request process, architecture, and/or style (e.g., through REST, GraphQL, and the like) that defines a set of constraints to provide interoperability through API usage. Referring to FIG. 3, in embodiments a commerce management engine 136 may constrain API requests from a user 302 (e.g., merchant device 102, online store 138, channels 110, applications 142, shipping providers 112, payment gateway 106, and the like) through an API request management facility 304, such as through API request throttling 306, an API request complexity model 308, API request allocations 310, and the like. For simplicity, in the following description references to a 'backend system' (or simply 'system') includes the commerce management engine 136 as a backend system with users providing API requests and receiving returned data as 'frontend users', such as in a server-client web service API configuration. Although for simplicity a conceptual framework of a backend system and frontend users has been utilized to depict a sender and receiver of API requests, it should be understood that references to a backend system and frontend users are generally representative of any two systems, applications, platforms, and the like, where one is making a request to another, such as for reading and/or writing data, and that reference to a front and backend system is not meant to be limiting in any way. For example, as described herein, the frontend users are described as sending requests to the backend system. However, more generally, the backend system may send API requests to the frontend users.

API request constraints may be required to protect against large queries and high query rates in API requests from a user to the backend system. These constrains also serve to protect against malicious agents attempting to overload the system. API request constraints limiting the rate of API requests (e.g., 1 request per second) and API request timeouts (e.g., limiting the execution of an API request processing to 5 seconds) may protect the backend system against issues associated with API request management, but still leave the system vulnerable to large queries and high query rates. Constraining API requests by only limiting the rate at which requests are received may be limited in effectiveness due to the great variability in impact of different API requests, where one API request may require the return of a single item of data, but where others may ask for very large volumes of data or perform write processes that require greater computational resources. Therefore, further degrees of complexity of an API request need to be considered in establishing limits.

Figure 4:
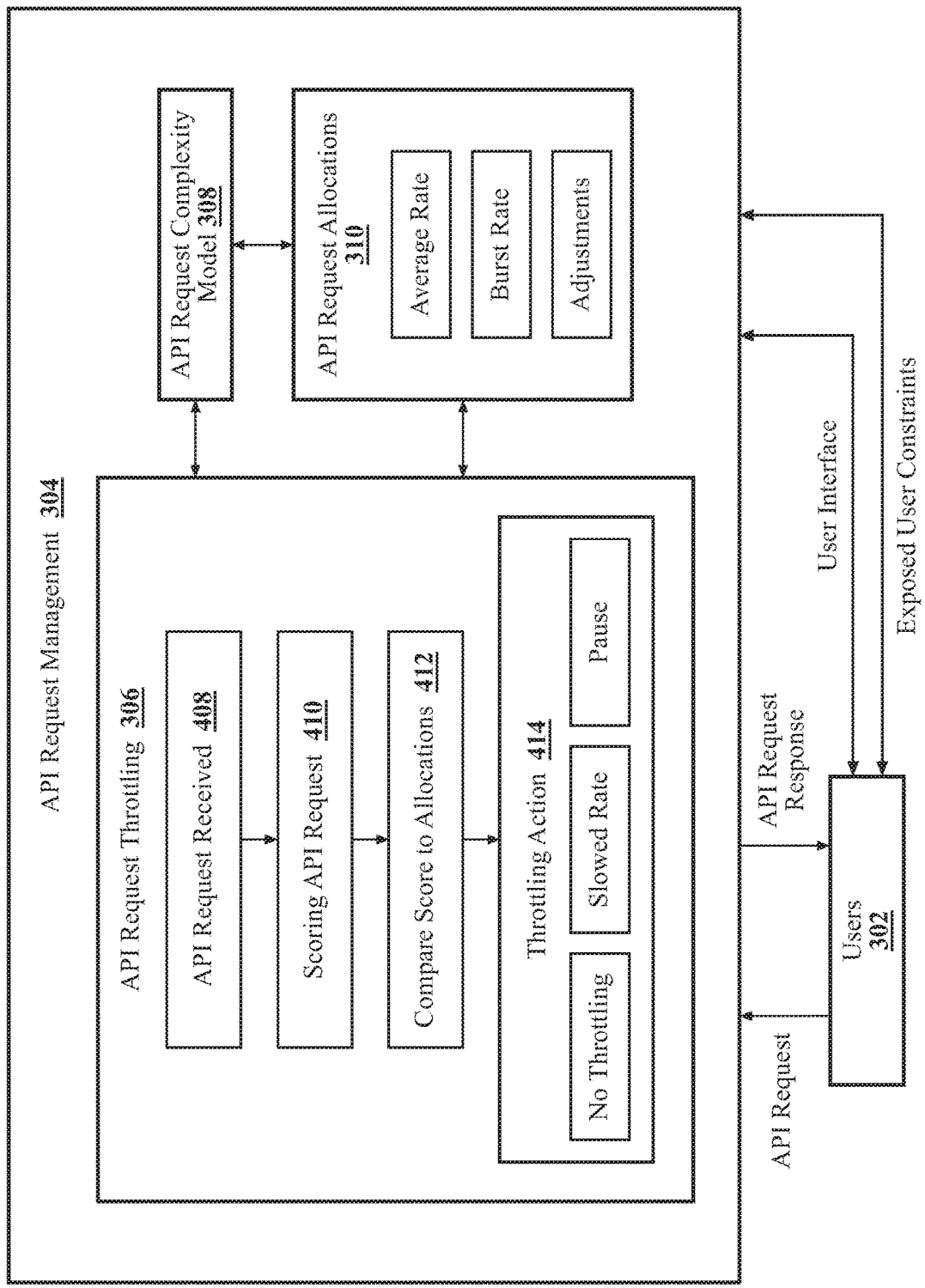
FIG. 4 depicts an embodiment process flow diagram for API requests between a backend system and frontend users.

In embodiments, it may be effective for the e-commerce platform 100 to constrain API requests being received by the commerce management engine 136 through dynamic throttling of API requests received from a user 302 through the API request management facility 304, such as based on the total number of API requests over a period of time, the size of an API request, the rate of API requests, the volume of the information requested, the number of API fields requested, the amount of computation need to complete/compute the request, whether the request is a read or a write request, and the like. Referring to FIG. 4, in embodiments the API request management facility 304 may provide for API request throttling 306 for API requests received 408 from users 302, such as through scoring the API request 410 with an API request complexity model 308 based on the complexity of the API request. The complexity may be determined through a processing algorithm, such as based on the number and complexity of nodes and/or fields within the API request, that determines an estimate of the extent to which the API request will impose processing load on the commerce management engine 136. Once the API is scored, the API request management facility 304 may compare the score 412 to API request allocations 310 (e.g., maximum average rate at which API requests may be received and/or processed, maximum burst volume and/or capacity of API requests over a period of time, and the like) to determine a throttling action 414 (e.g., imposing no throttling of API requests because the API requests are being received within the API request allocations 310, a slowed rate of receiving and/or processing of API requests because the API requests are near the limits of the API request allocations 310, pausing the reception and/or processing of API requests because the API requests have exceeded the limits of the API request allocations 310, and the like).

In embodiments, the API request management facility 304 may determine and utilize an actual measure of the processing load that an API request imposes on the commerce management engine 136 as a result of the API request being processed (e.g., executing the API request and sending results to the user), and compare the measure of the processing load to an estimate of the processing load as determined from the scoring of the API request 410. For instance, the scoring of an API request may determine a score of 50 points for the API request, which is an estimated measure of the processing load the API request would place on the commerce management engine 136. The management facility 304 may then execute the API request and determine an actual measure of the processing load to be equivalent to a score of 45 points. As such, the API request management facility 304 imposed a processing 'cost' of 50 points that turned out to be greater than the actual processing cost of 45 points. In this instance, the API request management facility 304 may make an adjustment to the API request allocations 310 to compensate for the overestimate. For example, a user may have a maximum burst API allocation of 1000 points, where the current level prior to the processing of the API request was 500 points. After processing the API request, the new level would be 450 as a result of subtracting the estimated 50 points for processing the API request. However, the actual cost was 45 points, which was 5 points less than the estimate. As a result, the API request management facility 304 may credit the user, such as crediting 5 points to the user's allocation, bringing the new current allocation to 455. In embodiments, the API request management facility 304 may adjust allocations based on any number of factors, such as crediting an allocation for over estimating a score, debiting an allocation for under estimating a score, adjusting an allocation based on activity across users, adjusting an allocation based on a peak activity of the commerce management engine 136, and the like.

Once the API request management facility 304 proceeds with processing an API request, the API request management facility 304 may then fulfill the request and provide an API request response to the user 302 (e.g., transmitting data that was requested by the API request, sending the user confirmation that data was written as requested by the API request, and the like).

Figure 5:
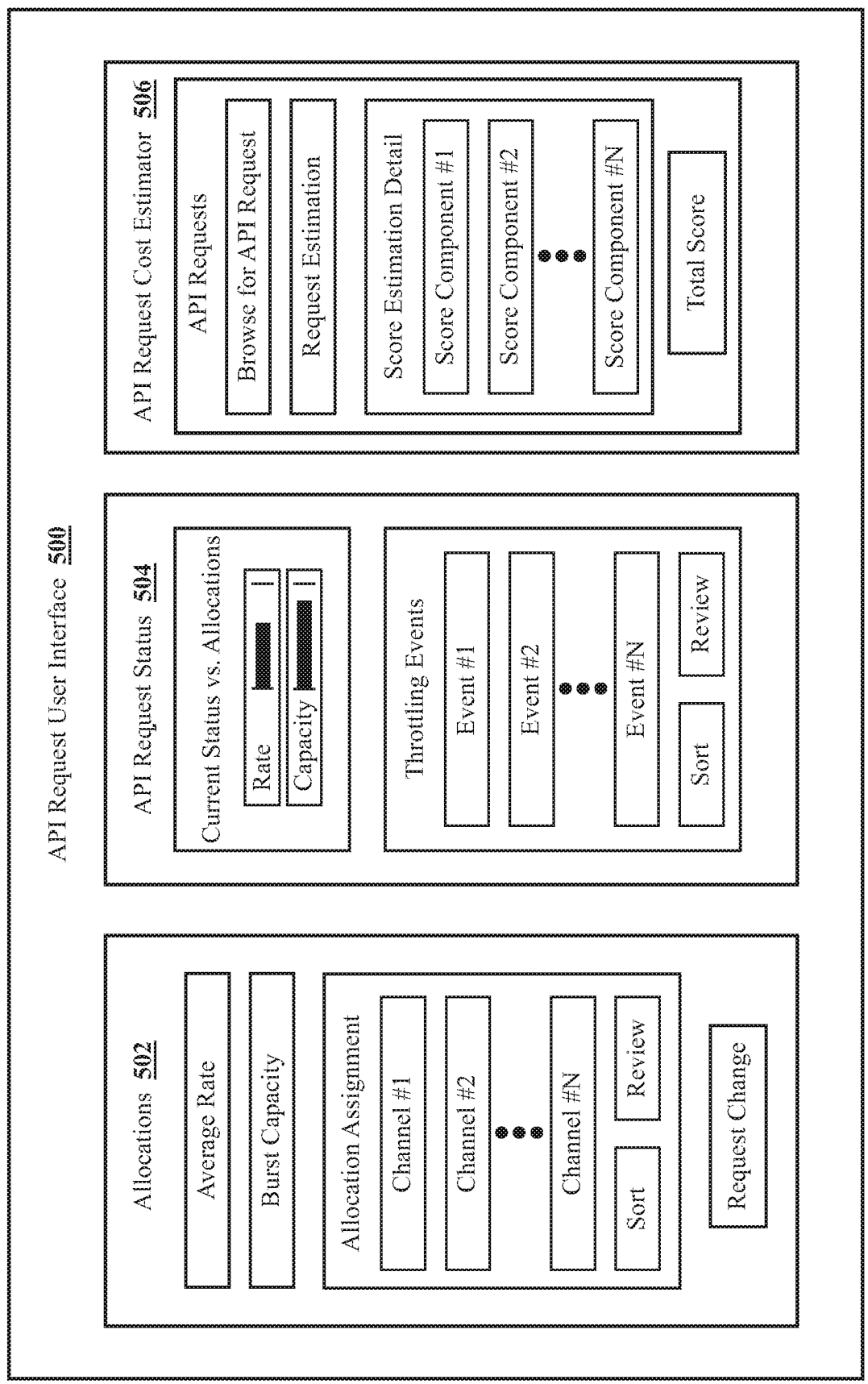
FIG. 5 depicts an embodiment of an API request user interface.

In addition, because constraints are being placed on API requests from users 302, it may be beneficial for the API request management facility 304 to expose the user allocations 310 being imposed to the user, such as the cost of a user's queries and the state of their allocations, so they can effectively manage their queries to avoid being throttled. For instance, user constraints may be exposed within an API request response to the user, as a separate communication to the user, through a user interface available to the user (such as depicted in FIG. 5), and the like. Further, a user may interface with the API request management facility 304 to access allocations, current levels of allocations, how the allocations are determined, how a specific API request was scored, how a new API request would be scored, and the like. Understanding the constraints placed upon a user's queries may allow the user to build queries that will stay within the allocation limits, and thus improve the user's API request bandwidth usage and assisting the e-commerce platform 100 in achieving performance and user experience goals.

In embodiments, scoring an API request 410 may extend across a range of complexity, such as for read vs. write operation/process (e.g., where a write operation could be a mutation), scalar fields vs. vector fields, expected data size (e.g., knowing that a particular field tends to return many megabytes of data and scoring it higher as a result), expected computational cost (e.g., knowing that a particular field is expensive to calculate (for example, if it is calculated remotely) and scoring it higher as a result), expected computational time (e.g. knowing a particular operation requires data from another system which may introduce delay and scoring it higher as a result), arguments provided in the API request query, the number of nodes and fields, the types of fields (e.g., scoring customer fields higher because the field contains personally identifiable information), and the like. For instance, the complexity could be reduced to a group of users receiving the same score for all API requests. For instance, a group of users may be identified as consistently having only simple API requests, and so the API request management facility 304 determines that no scoring is required to help the API request management facility 304 manage the relative costs of the API requests being received from these users (for example, all API requests receive a score of 1 so only the number of requests per unit of time is managed). At a next level of complexity, a score could be determined by counting the number of request nodes in an API request. However, counting nodes alone, without considering the underlying complexity associated with each node, may result in a scoring algorithm that is too variable and where the scores are not reflective of the cost of processing the requests, and as such, less effective than if the underlying complexity was evaluated by the API request management facility 304. For instance, the API request management facility 304 may utilize an API request complexity model 308 that utilizes a complexity limit for each API request by considering not just the number nodes in the API request, but by considering the number and complexity of any fields associated with the nodes. In embodiments, the API request management facility 304 may score an API request based on different aspects of the API request, such as the number of nodes in the request, fields associated with each node, whether the field is a scalar field or a vector field, and the like. Further, the API request management facility 304 may evaluate whether an API request is a read query or a more complex write process. For instance, an API request may be received 408 by the API request management facility 304, where the API request management facility 304 utilizes the API request complexity model 308 to score the API request 410. The API request complexity model 308 may first determine if the API request is a read or write request, where there may be different scoring for a read and a write request. Assuming the API request in this instance is a read request, the API request management facility 304 may then begin evaluating the fields associated with each node in the API request, assigning a score for each field. Once scores are assigned for each of the fields, the API request management facility 304 may then combine the field scores to generate a total field score for the API request for use by the API request complexity model, such as for constraining a processing of the received API request from the user. In embodiments, if in the process of determining a score for an API request, it is determined that the score is in excess of an allocation, then the scoring process may be stopped before completion and return simply that the score will be higher than the allocation. In a non-limiting example, the following API request may illustrate various scoring factors associated with elements of the API request, such as 'updateCustomer' (e.g., a write operation that may be scored higher), 'addresses: ["123 Main St.","456 West Avenue"]' (e.g., the number of the addresses provided may count towards the score), 'readCustomer(id:1)' (e.g., a read operation for the same customer and so may be scored lower), 'name' (e.g., a small scalar field that may be scored lower (and possibly free)), 'biography' (e.g., a scalar field (e.g., a string) that may return a large amount of data and thus may be scored higher), 'socialSecurityNumber' (e.g., a sensitive field and thus may be scored higher), 'totalLifetimePurchases' (e.g., may require a resource consuming processing calculation (e.g., fetching and adding all purchases) and thus may be scored higher), and 'address' (e.g., a vector field and thus may be scored higher or dynamically scored based on the expected number of addresses).

```
{
    updateCustomer(
    id: 1
    addresses: ["123 Main St.", "456 West Avenue"]
    )
    readCustomer(id: 1) {
        name
        biography
        socialSecurityNumber
        totalLifetimePurchases
        addresses
    }
}
```

API request scores may be based on a calculated cost for each individual API request, such as where each field has an integer cost value assigned to it, and the cost of a query is the sum of the costs of each field. In embodiments, fields (e.g., which may be connection fields) may have a multi-plying effect on the cost of their sub-selections, such as based on the first or last arguments. In embodiments, calculation of the cost of an API request may be made before (e.g., an estimated cost) and after API request execution (e.g., an actual cost). The estimated cost may be based on the number of fields requested. The actual cost may be based on the results returned. For instance, an API request execution may cost less than the estimated value because it ended early due to an object type field returning null, or fields can return fewer edges than requested. In embodiments, the difference between the estimated cost and the actual cost may be credited or debited from a current allocation status level (e.g., an average maximum rate or how much burst capacity remains).

Before deciding on values for specific scores, a measure for assigning complexity needs to be determined for use in association with the API request complexity model. At a first level of complexity, assigning a complexity value that is relatively representative of the actual cost of a query is to count the number of nodes being requested with consideration to scored complexity fields. For instance, each object-type field may be assigned a complexity value of 1, with an override for fields that significantly differ in their cost of resolution. Scalar-type fields typically don't add a significant additional resolution cost, as they are typically already loaded (e.g., by ActiveRecord, which is a layer of the system responsible for representing business data and logic) when the parent object-type is loaded, so they may be assigned a complexity value of 0, which likewise can be overridden. While assigning a sensible default complexity value to query fields may be somewhat straightforward, predicting the cost to the system due to a write process is not as easily determined, particularly because many write processes also spawn background jobs. Two write processes that look the same schematically are much more likely to have significant differences in resolution cost than schematically similar query fields. As a result of this, write processes may require more overrides based on their individual estimated costs. However, just as a baseline complexity value of '1' was assigned for object-type query fields, a baseline complexity value for write processes may be assigned as well. In general, writes have a significantly higher cost than reads, so it makes sense to apply a much higher baseline (e.g., assigning 100 for write processes). In embodiments, the return query of the write processes may still be scored separately from the resolution of the write process, such as based on query complexity rules. Further, a field's complexity value may not be static, but dynamically calculated at query run-time based on a field or write process arguments. One particular case where this may be important is in the case where a field's complexity cost may be multiplied, such as by the value in the 'first' or 'last' argument.

With respect to a baseline request complexity, there may also be a certain amount of overhead in each request that is not accounted for in the calculated query complexity. This means for example that making 100 requests with a query complexity of 10 will have a bigger impact on the system than a single request for the same data with a query complexity of 1000. To account for this, API requests may start at a baseline complexity value, to which a calculated query complexity is added.

Assigning complexity values to the multiple fields of an API request allows for a more accurate method for throttling than just counting numbers of nodes or fields. A single request may have many fields (e.g., 50 fields) where the fields may vary greatly in complexity and load to the backend system. In order to accurately estimate the impact an API request will have, the complexity of the various factors within the request need to be considered, such as the amount of data that each field will generate in a return response, the time for execution, the number of database queries being made, how much data manipulation is being required, how much joining is involved in the request, and the like. The API request management facility 304 can then evaluate the costs for each field and determine a total score for the request.

In embodiments, the API request management facility 304 may be configured to evaluate a variety of different API request structures. The following examples are meant to be illustrative and not limiting in any way, depicting examples of various levels of API request complexity and associated example scoring. For instance, a query such as the following (especially if run by multiple users) depicts an example API request that may create a significant load on the system. As such, it illustrates the limits to which a simple API request rate structure could be effective, where despite being only a single API request, the request asks for 250 variants of 250 products, which produces 62,500 request nodes.

```
{
    shop {
        products(first: 250) {
            edges {
                node {
                    variants(first: 250) {
                        edges {
                            node {
                                id
                                title
                            }
                        }
                    }
                }
            }
        }
    }
}
```

Therefore, managing through only limiting based on rates of incoming API requests, where the complexity of a single API request may be imparting a large load to the backend system, may not be sufficient to manage performance of the system for all users.

Scoring API requests, such as based on the complexity associated with processing load that a particular API is predicted to impart upon the system, may provide better load management for the backend system. Content nodes may be counted to determine a request complexity for the API request and used in limiting API requests based on the complexity of the request, where some API requests will be determined to have a low content complexity (e.g., small number of nodes) and others a high content complexity (large number of nodes), and where that information may be used to place constrains upon API request processing. For example, the following statically analyzed query would request a single node (the shop name), and therefore represents a low complexity request:

```
{
    shop {
        name
    }
}
```

However, using fields and list types multiplies the number of nodes in a request, such as in the following query that requests 100 variants of 100 products (in addition to the one node for the 'shop' request itself), for a total of 10,001 nodes, a higher complexity API request.

```
{
    shop {
        products(first: 100) {
            edges {
                node {
                    variants(first: 100) {
                        edges {
                            node {
                                id
                                title
                            }
                        }
                    }
                }
            }
        }
    }
}
```

However, a node count based constraint limit may stop large queries from being executed but may not prevent users from sending multiple queries that would pass a 'nodes test', but at a rate that would adversely load the backend system. A 'time throttle' constraint process may serve to handle this type of issue, however, even with a time throttling implementation (such as including a 25 second timeout), the backend system may be unable to act until it is too late, such as after the system has already spent significant server time and resources attempting to fulfil the query, and may already be experiencing load balancing issues from the impact. Unfortunately, scoring based on the number of nodes fetched by the backend does not consider fields selected on these nodes and those fields may vary in complexity. As a result, it may be better to consider the fields associated with each node in determining the total cost of an API request. However, simple field counting may not be sufficient. For instance, in applications that are directed to create, update, read, and delete (CURD processes), having more or fewer fields selected on a type does not usually increase the load. Instead, counting type accesses or selection sets in determining the cost of the query may result in a more accurate measure of complexity since usually only object types will add load on the servers (e.g., when loading a resource). For example, there may be a default complexity when the field's type is an object type (e.g., a resource is fetched) and a lower value when the type is a scalar.

For write processes, a single resource load may not reflect the true 'cost' of this type of operation, where a write processes may range from a very low cost to a very high cost. For instance, write process complexity may often depend on an input (arguments) and output (fields that are selected on the return type). As a result, 'scoring' the complexity cost for a write process may differ from scoring the complexity for actions that are fetching data. In examples, the following two API requests represent write process calls with costs for multiple calls:

```
mutation {
    refundCreate(input: {orderId: "gid://ecomplatform/Order/1"}) {
        refund {
            id
        }
    }
}
```

The cost for this request is 21: 'refundCreate' costs 20, 'refund' defaults to 1, and 'id' is a scalar field that defaults to a cost of zero.

```
Mutation {
    inventoryAdjustQuantity(input: {inventoryLevalId:
    "gid://ecomplatform/InventoryLevel/1", availableDelta: 5}) {
        inventoryLevel {
            id
            createAt
            available
        }
    }
}
```

The cost for this request is 5: 'inventoryAdjustQuantity' has a cost of 5, and 'inventoryLevel' has a cost of zero. Further, requests that are write processes may become more complex, with fields and sub-fields. In embodiments, in such instances an initially calculated score may be overridden with a modified score. For instance, the system may establish a default score (e.g., a default score of 10), and when an API request is determined to generate greater processing time the score may be adjusted upward, and when determined to generate lesser processing time the score may be adjusted downward.

Users have an interest in creating API requests that do not result in high scores, which could cause loading issues to the backend system and potentially result in being constrained (e.g., paused, throttled, and the like). Allocation values alone do not necessary aid users in identifying load issues (e.g., high scores) related to their API requests, as they typically have limited visibility into how their API requests will affect the backend system prior to executing the API request. Referring to FIG. 5, in a non-limiting example embodiment, an API request user interface 500 may be provided to aid a user in identifying potential issues associated with API requests, such as including an API request estimator 506. For instance, an API request estimator 506 may provide a way for the user to browse and select/request an API request to be scored by the API request management facility 304. The returned scored result may provide score estimation detail, such as for score components (e.g., scores for different fields), a total score, and the like. The score estimation detail may be sorted to prioritize score components based on those that have the greatest impact on the total score. For instance, one particular field may request a great deal of data and result in a highly scored component that dominates the total cost. Knowing this, the user may adjust the design of the API request to reduce the impact of that field and re-run the estimator to see how the score is changed. In this way a user may be able to design API requests that satisfy their application requirements without adversely impacting allocation usage levels. In embodiments, a user may be able to use an offline tool or tool separate from the API request management facility 304 that estimates an API request score, estimate scores through documentation that outlines how an API request is scored, and the like.

Scoring of the API requests then allows for constraining the execution of API requests being transmitted from a user based on allocations set for the user in order to better manage the processing load on the backend system, such as by smoothing processing load across the e-commerce platform 100 and eliminating the impacts of unexpected outliers (e.g., a sudden peak demand from one user that adversely affects other users). In embodiments, allocations may be set for an average rate (e.g., scored value over time), a maximum rate, a burst rate, a maximum volume, and the like. Allocations may be set statically, or they may be adjusted as conditions dictate. For instance, allocations may be adjusted for scheduled events (e.g., a flash sale or a high-volume day or time period (e.g., Black Friday and Cyber Monday)), and the like. Allocations may be adjusted dynamically in real time, such as through monitoring trends in API requests for the user, for users across the e-commerce platform 100, based on processing load on the commerce management engine 136, and the like.

Allocations may be varied based on a characteristic of the user (e.g., level of expertise of the user, scores from past API requests from the user, and the like), merchant size (e.g., merchants receiving an allocation proportional to the number of orders they process so that API allocation scales naturally with business volume), complexity of an application (e.g., estimated data requirements for the application, scores from past API requests from the application, and the like), a pricing plan (e.g., preferred pricing plan may receive double the normal allocation, extremely large merchants may negotiate custom plans with greater allocation, and the like), risk analysis (e.g., using risk and/or fraud detection algorithms and reducing allocations for applications or merchants determined to be risky or likely to be bad actors), through a constraint limit market place (e.g., across a plurality of users that trade constraint and allocation resources), or other like reasons for varying allocations. In embodiments, API request allocations may be assigned per merchant, user, user type, application, storefront, combination of storefronts, activity, product line, and the like. Users may be assigned different constraint limits and allocations, or be selectable through a user or administrator interface (e.g., through a user interface with a slider for constraint limits, allocations, multipliers, and the like).

In embodiments, different user types may be assigned multipliers to alter the costs and/or allocations used in the system. For example, an enterprise user may be assigned a greater multiplier than a smaller individual merchant. In embodiments, normalization factors may be assigned to variable users in the assignment of multipliers, such as to equalize treatment of different, sometimes divergent, users (e.g., for the enterprise user vs. a merchant with a physical storefront vs. an individual selling drop-shipped products). Normalizing factors may be adjusted dynamically to compensate for changes to a user's sales activity, products, service type, inventory volume, and the like.

In embodiments, allocations may be dynamically modified to account for events (e.g., a high-demand sales period, such as Black Friday), for real-time events (e.g., a flash sale or high volume part of the day), over time (e.g., adjusting on a periodic basis to account for changes in the effectiveness of the constraint model (e.g., once a day or once a month)), time of day (e.g., lunchtime on a weekday when people are personally active on the web at work), peak vs. off-peak periods (e.g., late evenings on a weekday when people are on the Internet or Saturday morning when people are catching up from the work week), and the like.

Referring to FIG. 5, allocations 502 may be presented to a user through an API request user interface 500, such as for average rate, burst capacity, and the like. Allocations may be distributed/assigned across different user channels (e.g., a user's online store, an application utilized by the online store, social media channel interfaces, and the like), where the user may be able to sort and review the assignments. In embodiments, a user may request a change to allocations, such as to the overall allocations, allocations assigned to channels, allocations for a period of time (e.g., for events, increased usage periods, and the like), allocations based on pricing, and the like. In embodiments, allocations may be dynamically managed by the API request management facility 304 based on scored API requests and associated processing loads placed on the backend system and/or through adjusting allocations assigned to the user.

In embodiments, allocations placed on scored API requests may utilize an API request complexity model 308 to set and dynamically adjust API request response constraints to control the API request load on the backend system and improve backend responsiveness (e.g., using scores determined over a period of time (e.g., over the past day, week, or month), updating the model over time, increasing database access speed, changing complexity weighting, and the like). In embodiments, the API request complexity model 308 may provide for comparison, reconciliation, feedback loop learning, and the like, such as when comparing the estimate score/cost for an API request to the actual impact it had on backend system performance. API request response constraints may be exposed to the user, such as through an API response user interface 500, so that the user (including a user system) is able to adjust the number, complexity, and rate at which the user system is making API requests in order to avoid being overly constrained (e.g., having API requests throttled).

Allocations for scored API requests may satisfy the needs of the backend system, but users may also need the system to accommodate a large number of API requests in a short time (e.g., a burst of API requests). One solution to this may be to implement a time-based 'leaky bucket' throttling system, whereby API users are assigned a burst allocation value (the bucket size), which when used gets restored to them in increments over time (the leak rate), such as at the average API response allocation rate. The term of art referred to as the leaky bucket model is an algorithm based on an analogy of how a 'bucket' with an input resource and output (a 'leak' at the bottom of the bucket) will overflow the capacity of the bucket if the average rate at which the input resource enters the bucket exceeds the output rate at which the resource leaks from the bucket. As such, several parameters need to be defined, including a maximum burst allocation of scored requests after which queries can no longer be executed or at least not at a full rate (the capacity of the bucket) and the average number of scored API requests allocated to the user per unit of time (the leak rate). By knowing the capacity of the bucket, the current level of the bucket (what capacity is left), and the scores for incoming API requests, the system can know whether to take a throttling action on the API request input to avoid exceeding the bucket capacity. Users, who want to understand and manage their limits and avoid being throttled, may manage their API request design and usage through visibility to allocations, usage, and throttling, such as through an API request user interface 500. Referring to FIG. 5, the user may be able to view an API request status 504, such as including a view of the current status vs. the user's allocations (e.g., with graphical indicators that show usage compared with allocations), throttling events, and the like. In embodiments, throttling events may include detail on the causes for the throttling, such as contributing sub-scores within an API request, and where the throttling events may be sorted and reviewed.

A leaky bucket rate limit may consider the score-cost of requests over a period of time, rather than the number of requests averaged over an extended time. For instance, an application may be given an average usage allocation of 50 points per second over time. However, the application is also given a burst allocation (bucket size) of 1000 points (which would have a leak rate of 50 cost points per second). This means that the total cost of a user's queries cannot exceed 1000 points over that short period of time (e.g., for a burst of API requests) or 50 points per second over an extended period of time, where the remaining capacity of the bucket is always being used up by input API requests and being replenished at the leak rate. If the bucket ever completely fills, further API requests would receive a throttling action based on the on-going available capacity of the bucket. By making simpler, low-cost queries, a user may be able to make more queries over time. In embodiments, the leaky bucket rate limit may use a combination of the estimated score-cost and the actual cost of the API request. Before execution of the API request can begin, the user's bucket must have enough room for the requested cost of the API request; then, once execution is complete, the bucket may be refunded the difference between the estimated cost and the actual cost of the API request. In this way, the approach uses score estimates to determine whether to throttle or not but uses actual costs to keep track of the allocations.

In embodiments, as described herein a user may know how much the API request will cost, and how much room they have in their bucket. Such limitation parameters may be provided to users through an API request user interface 500, but in embodiments through API request fulfillment data, such as in association with meta field and type. In embodiments, using a rate limit type may allow users to see the API request cost at runtime. In an example, parameters provided through meta field and type may include query type, write process type, and rate limit type, such as in the following:

```
type Query {
    rateLimits: RateLimits!
}
type Mutation {
    rateLimits: RateLimits!
}
type RateLimits {
    # Cost of the query that has just been run.
    currentQueryCost: Int!
    # maximum amounts of points a client can query in x time frame.
    maximum: Int!
    # remaining points before throttled.
    remaining: Int!
    # Time at which the remaining field resets.
    resetsAt: DateTime! fillRate?
}
```

In embodiments, a user may have allocations and throttling events and related information determined or presented through a user interface, from documentation, based on a schema, by query to the API request complexity model (e.g., for a user to determine what is driving complexity their queries in order to help identify and reduce complexities and simplify future queries and reduce the score), and the like. There are two main parameters that the user may be interested in, (1) the cost of their API requests and the state of their allocation (such as a leaky bucket) so they can effectively manage their API requests to avoid being throttled, and (2) how the complexity of their API requests are derived so they have a good understanding of how to build API requests that will stay within the limits. For API request cost and allocation state (such as leaky bucket state), in embodiments, this may be made through data the system exposes through a schema, and for which users may be allowed to query the system. For example, a schema for that structure may be as follows:

```
type RateLimits {
    # The maximum complexity accepted from a single query.
    maximumQueryComplexity: Int!
    # Complexity of the query that has just been run.
    currentQueryComplexity: Int!
    # The current state of the leaky bucket.
    leakyBucket: LeakyBucket!
}
type LeakyBucket {
    # The size of the bucket, in complexity value.
    size: Int!
    # The complexity available in the bucket.
    available: Int!
    # The amount of complexity that leaks from the bucket per second.
    leakRate: Int!
}
type QueryRoot {
    # Represents the API client's rate limits
    rateLimits: RateLimits!
type Mutation {
    # Represents the API client's rate limits
    rateLimits: RateLimits!
}
``` through extensions, and the like. For instance, field and type complexity may be made available by inspecting the schema and automatically included in documentation generated from the schema. When the complexity is static, the system could automatically append that information to the description. When dynamic, the system may provide an explanation for how it is calculated based on arguments. In another instance, an extensions key may be made available in a query response, where exposing metadata such as a breakdown of field complexity may be provided. Since this could result in a large amount of additional data being returned to the user, depending on the size of the query, the system may require that the key with metadata be explicitly requested by a user (not provided by default), for example through a request parameter or header. In an example, the request query and return could look similar to the following, where complexity costs are provided in the return (e.g., 'product' complexity has a score of '1', and 'title' has a complexity of '0':

```
For query:
{
    product(id: "gid://shopify/Product/1") {
        title
        vendor
        collections(first: 10) {
            edges {
                node {
                    title
                }
            }
        }
    }
}
Return:
{
    "data": ...,
    "extensions": {
        "complexity_breakdown": {
            "product": {
                "complexity": 1,
                fields: {
                    "title": { "complexity": 0 },
                    "vendor": { "complexity": 0 },
                    "collections": {
                        "complexity": 10,
                        "fields": {
                            "edges": {
                                "complexity": 0,
                                "fields": {
                                    "node": {
                                        "complexity": 0,
                                        "fields": {
                                            "title": {
                                                "complexity": 0
                                            }
                                        }
                                    }
                                }
                            }
                        }
                    }
                }
            }
        }
    }
}
```

In embodiments, communicating to users how a query's complexity is derived may be provided by including information as part of type/field descriptions, exposing them In two other examples, cost with respect to a leaky bucket type implementation illustrates what the system may return when an API request is made with and without a special header set to true (set to true being in the second example) that would result in returning a detailed breakdown of costs. Here, 'requestedQueryCost' is the precomputed cost of the query that ran, actualQueryCost is the post-computed actual cost charged for the API request that ran, 'maximumAvailable' is the size of the bucket, 'currentlyAvailable' is the amount left in the bucket, 'restoreRate' is how fast the bucket refills (e.g., in units per second), and all items under 'fields' is the more detailed breakdown.

```
"extensions": {
    "cost": {
        "requestedQueryCost": 101,
        "actualQueryCost": 46,
        "throttleStatus": {
            "maximumAvailable": 1000,
            "currentlyAvailable": 954,
            "restoreRate": 50
        }
    }
}
```

For a user to get a detailed breakdown of how each field contributes to the requested cost, they can make their query with a special fields header set to true, such as in the following example:

```
"extensions": {
    "cost": {
        "requestedQueryCost": 101,
        "actualQueryCost": 46,
        "throttleStatus": ...,
        "fields": [
            {
                "path": [
                    "shop"
                ],
                "definedCost": 1,
                "requestedTotalCost": 101,
                "requestedChildrenCost": 100
            },
            ...
        ]
    }
}
```

In embodiments, the API request management facility 304 may utilize the scoring of a complexity measure for a plurality of API request aspects (e.g., nodes, fields, and the like) to constrain a processing of received API requests from a user. For instance, the API request management facility may receive an API request from a user device, where the API request may include at least a first request field and a second request field. The API request management facility 304 may evaluate the first and second request fields to determine a first and second complexity measure and assign a first and second field score to the first and second request fields based on the complexity measure. The API request management facility 304 may then combine the first field score and the second field score to generate a total field score for the API request for use in an API request complexity model for constraining a processing of the received API request from the second computing device. In embodiments, the API request may be one of a plurality of API requests, and where the API request complexity model may factor previous API requests in constraining the processing of received API requests. Constraining the processing of received API requests may include delaying the processing of the API request based on an output of the API request complexity model based on the total field score for the API request. At least one of the first complexity measure and second complexity measure may be determined by evaluating a field type. Constraining the processing of received API requests may include slowing a rate of processing of subsequently received API requests based on an output of the API request complexity model as a result of the total field score for the API request. In embodiments, the API request management facility 304 may utilize a leaky bucket type limitation scheme, such as where the output of the API request complexity model is a level value that is a fraction of a maximum score limit for accumulated API request scores, the output of the API request complexity model is an overflow indication that a maximum score limit has been exceeded for accumulated API request scores, and/or the rate of processing of subsequently received API requests is reduced to zero. In embodiments, the API request management facility 304 may compare API request usage, an allocation limit, and the like, such as where the API request management facility 304 retrieves an API request allocation limit and a current API request usage level from the API request complexity model, where the API request management facility 304 combines the total field score and the current API request usage level to generate a new API request usage level. The API request management facility 304 may then compare the new API request usage level and the allocation limit and process the API request if the new API request usage level has a value less than the allocation limit. In embodiments, a usage level may be adjusted based on the actual processing load from an API request, such as where the API request management facility 304 processes the API request and measures a processing load on resulting from the processing of the API request, where the measured processing load is compared to an estimated processing load determined from the total field score to determine a compensation measure to adjust the new API request usage level. The compensation measure may increase the new API request usage level because the measured processing load is less than the estimated processing load, decrease the new API request usage level because the measured processing load is greater than the estimated processing load, and the like. The API request allocation limit may be dynamically calculated at a query run-time of the API request based on a field content of at least one of the first request field and the second request field. In embodiments, system performance may be improved through evolving an API request complexity modeling, such as where the API request complexity model incorporates feedback loop learning with respect to increasing processing performance of the first computing device, where the feedback loop learning compares processing performance from a first period of time to a processing performance from a second period of time, wherein the first period of time utilizes a first set of complexity measures and the second period of time utilizes a second set of complexity measures.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
  receiving, at a first computing device, an application programming interface (API) request from a second computing device, wherein the API request comprises at least a first request field and a second request field;
  evaluating at least the first request field to determine a first complexity measure;
  assigning a first field score to at least the first request field based on the first complexity measure;
  evaluating at least the second request field to determine a second complexity measure;
  assigning a second field score to at least the second request field based on the second complexity measure;
  combining the first field score and the second field score to generate a total field score for the API request; and
  constraining, using an API request complexity model and the total field score, a processing of the received API request from the second computing device.

2. The computer-implemented method of claim 1, wherein the API request is one of a plurality of API requests from the second computing device, and wherein the API request complexity model factors previous API requests from the second computing device in constraining the processing of received API requests from the second computing device.

3. The computer-implemented method of claim 1, wherein constraining the processing of received API requests includes delaying the processing of the API request based on an output of the API request complexity model based on the total field score for the API request.

4. The computer-implemented method of claim 1, wherein at least one of the first complexity measure and the second complexity measure is determined by evaluating a field type.

5. The computer-implemented method of claim 1, wherein constraining the processing of received API requests includes slowing a rate of the processing of subsequently received API requests based on an output of the API request complexity model as a result of the total field score for the API request.

6. The computer-implemented method of claim 5, wherein the output of the API request complexity model is a level value that is a fraction of a maximum score limit for accumulated API request scores.

7. The computer-implemented method of claim 5, wherein the output of the API request complexity model is an overflow indication that a maximum score limit has been exceeded for accumulated API request scores.

8. The computer-implemented method of claim 7, wherein the rate of the processing of subsequently received API requests is reduced to zero.

9. The computer-implemented method of claim 1, further comprising:
   retrieving an API request allocation limit and a current API request usage level from the API request complexity model;
   combining the total field score and the current API request usage level to generate a new API request usage level;
   comparing the new API request usage level and the API request allocation limit; and
   processing the API request if the new API request usage level has a value less than the API request allocation limit.

10. The computer-implemented method of claim 9, further comprising processing the API request and measuring a processing load on the first computing device resulting from the processing of the API request, wherein the measured processing load is compared to an estimated processing load determined from the total field score to determine a compensation measure to adjust the new API request usage level.

11. The computer-implemented method of claim 10, wherein the compensation measure increases the new API request usage level because the measured processing load is less than the estimated processing load.

12. The computer-implemented method of claim 10, wherein the compensation measure decreases the new API request usage level because the measured processing load is greater than the estimated processing load.

13. The computer-implemented method of claim 9, wherein the API request allocation limit is dynamically calculated at a query run-time of the API request based on a field content of at least one of the first request field and the second request field.

14. The computer-implemented method of claim 1, wherein the API request complexity model incorporates a feedback loop learning with respect to increasing processing performance of the first computing device.

15. The computer-implemented method of claim 14, wherein the feedback loop learning compares a processing performance of the first computing device from a first period of time to a processing performance from a second period of time, wherein the first period of time utilizes a first set of complexity measures and the second period of time utilizes a second set of complexity measures.

16. A system comprising:
   a first computing device adapted to receive an application programming interface (API) request from a second computing device, wherein the API request comprises at least a first request field and a second request field, the first computing device configured to store a set of instructions that, when executed, cause the first computing device to:
   evaluate at least the first request field to determine a first complexity measure;
   assign a first field score to at least the first request field based on the first complexity measure;
   evaluate at least the second request field to determine a second complexity measure;
   assign a second field score to at least the second request field based on the second complexity measure;
   combine the first field score and the second field score to generate a total field score for the API request; and
   constrain, using an API request complexity model and the total field score, a processing of the received API request from the second computing device.

17. The system of claim 16, wherein the API request is one of a plurality of API requests from the second computing device, and wherein the API request complexity model factors previous API requests from the second computing device in constraining the processing of received API requests from the second computing device.

18. The system of claim 16, wherein constraining the processing of received API requests includes delaying the processing of the API request based on an output of the API request complexity model based on the total field score for the API request.

19. The system of claim 16, wherein at least one of the first complexity measure and the second complexity measure is determined by evaluating a field type.

20. The system of claim 16, wherein constraining the processing of received API requests includes slowing a rate of the processing of subsequently received API requests based on an output of the API request complexity model as a result of the total field score for the API request.

21. The system of claim 20, wherein the output of the API request complexity model is a level value that is a fraction of a maximum score limit for accumulated API request scores.

22. The system of claim 20, wherein the output of the API request complexity model is an overflow indication that a maximum score limit has been exceeded for accumulated API request scores.

23. The system of claim 21, wherein the rate of the processing of subsequently received API requests is reduced to zero.

24. The system of claim 16, wherein the first computing device is configured to further store a set of instructions that, when executed, cause the first computing device to:
   retrieve an API request allocation limit and a current API request usage level from the API request complexity model;
   combine the total field score and the current API request usage level to generate a new API request usage level;
   compare the new API request usage level and the API request allocation limit; and process the API request if the new API request usage level has a value less than the API request allocation limit.

25. The system of claim 24, wherein the first computing device is configured to further store a set of instructions that, when executed, cause the first computing device to:
process the API request and measure a processing load on the first computing device resulting from the processing of the API request, wherein the measured processing load is compared to an estimated processing load determined from the total field score to determine a compensation measure to adjust the new API request usage level.

26. The system of claim 25, wherein the compensation measure increases the new API request usage level because the measured processing load is less than the estimated processing load.

27. The system of claim 25, wherein the compensation measure decreases the new API request usage level because the measured processing load is greater than the estimated processing load.

28. The system of claim 24, wherein the API request allocation limit is dynamically calculated at a query run-time of the API request based on a field content of at least one of the first request field and the second request field.

29. The system of claim 16, wherein the API request complexity model incorporates a feedback loop learning with respect to increasing processing performance of the first computing device.

30. The system of claim 29, wherein the feedback loop learning compares a processing performance of the first computing device from a first period of time to a processing performance from a second period of time, wherein the first period of time utilizes a first set of complexity measures and the second period of time utilizes a second set of complexity measures.

31. A non-transitory computer-readable medium having stored thereon instructions, that when performed by a processor of a first computing device, cause the computing device to at least:
receive, at the first computing device, an application programming interface (API) request from a second computing device, wherein the API request comprises at least a first request field and a second request field;
evaluate at least the first request field to determine a first complexity measure;
assign a first field score to at least the first request field based on the first complexity measure;
evaluate at least the second request field to determine a second complexity measure;
assign a second field score to at least the second request field based on the second complexity measure;
combine the first field score and the second field score to generate a total field score for the API request; and
constrain, using an API request complexity model and the total field score, a processing of the received API request from the second computing device.

32. The non-transitory computer-readable medium of claim 31, wherein the API request is one of a plurality of API requests from the second computing device, and wherein the API request complexity model factors previous API requests from the second computing device in constraining the processing of received API requests from the second computing device.

33. The non-transitory computer-readable medium of claim 31, wherein constraining the processing of received API requests includes delaying the processing of the API request based on an output of the API request complexity model based on the total field score for the API request.

34. The non-transitory computer-readable medium of claim 31, wherein at least one of the first complexity measure and the second complexity measure is determined by evaluating a field type.

35. The non-transitory computer-readable medium of claim 31, wherein constraining the processing of received API requests includes slowing a rate of the processing of subsequently received API requests based on an output of the API request complexity model as a result of the total field score for the API request.

36. The non-transitory computer-readable medium of claim 35, wherein the output of the API request complexity model is a level value that is a fraction of a maximum score limit for accumulated API request scores.

37. The non-transitory computer-readable medium of claim 35, wherein the output of the API request complexity model is an overflow indication that a maximum score limit has been exceeded for accumulated API request scores.

38. The non-transitory computer-readable medium of claim 37, wherein the rate of the processing of subsequently received API requests is reduced to zero.

39. The non-transitory computer-readable medium of claim 31, further comprising instructions, that when performed by a processor of a first computing device, cause the computing device to at least:
retrieve an API request allocation limit and a current API request usage level from the API request complexity model;
combine the total field score and the current API request usage level to generate a new API request usage level;
compare the new API request usage level and the API request allocation limit; and
process the API request if the new API request usage level has a value less than the API request allocation limit.

40. The non-transitory computer-readable medium of claim 39, further comprising instructions, that when performed by a processor of a first computing device, cause the computing device to at least:
process the API request and measure a processing load on the first computing device resulting from the processing of the API request, wherein the measured processing load is compared to an estimated processing load determined from the total field score to determine a compensation measure to adjust the new API request usage level.

41. The non-transitory computer-readable medium of claim 40, wherein the compensation measure increases the new API request usage level because the measured processing load is less than the estimated processing load.

42. The non-transitory computer-readable medium of claim 40, wherein the compensation measure decreases the new API request usage level because the measured processing load is greater than the estimated processing load.

43. The non-transitory computer-readable medium of claim 39, wherein the API request allocation limit is dynamically calculated at a query run-time of the API request based on a field content of at least one of the first request field and the second request field.

44. The non-transitory computer-readable medium of claim 31, wherein the API request complexity model incorporates a feedback loop learning with respect to increasing processing performance of the first computing device.

45. The non-transitory computer-readable medium of claim 44, wherein the feedback loop learning compares a processing performance of the first computing device from a first period of time to a processing performance from a second period of time, wherein the first period of time utilizes a first set of complexity measures and the second period of time utilizes a second set of complexity measures.

* * * * *